(12) United States Patent
Som

(10) Patent No.: US 9,387,587 B2
(45) Date of Patent: Jul. 12, 2016

(54) METHOD FOR OPERATING AN INDUSTRIAL ROBOT

(71) Applicant: REIS GROUP HOLDING GMBH & CO. KG, Obernburg (DE)

(72) Inventor: Franz Som, Lutzelbach (DE)

(73) Assignee: REIS GROUP HOLDING GMBH & CO. KG, Obernburg (DE)

( * ) Notice: Subject to any disclaimer, the term of this patent is extended or adjusted under 35 U.S.C. 154(b) by 0 days.

(21) Appl. No.: 14/389,811

(22) PCT Filed: Apr. 5, 2013

(86) PCT No.: PCT/EP2013/057187
§ 371 (c)(1),
(2) Date: Oct. 1, 2014

(87) PCT Pub. No.: WO2013/150134
PCT Pub. Date: Oct. 10, 2013

(65) Prior Publication Data
US 2015/0081097 A1    Mar. 19, 2015

(30) Foreign Application Priority Data
Apr. 5, 2012    (DE) .......................... 10 2012 103 031

(51) Int. Cl.
*G05B 19/04*    (2006.01)
*G05B 19/18*    (2006.01)
(Continued)

(52) U.S. Cl.
CPC ................ *B25J 9/161* (2013.01); *B25J 9/1656* (2013.01); *G05B 19/409* (2013.01); *G05B 2219/36168* (2013.01); *G05B 2219/40099* (2013.01)

(58) Field of Classification Search
CPC .......... B25J 13/06; B25J 9/161; B25J 9/1656; G06F 3/04883; G05B 19/409; G05B 2219/36168; G05B 2219/40099
USPC .......................... 700/245, 253, 257, 262, 264
See application file for complete search history.

(56) References Cited

U.S. PATENT DOCUMENTS 5,091,855 A    2/1992  Umehara et al.
5,937,143 A *  8/1999  Watanabe .............. B25J 9/1671
                                                      700/264

(Continued)

FOREIGN PATENT DOCUMENTS

CN          1886237 A      12/2006
CN        101198925 A       6/2008
(Continued)

OTHER PUBLICATIONS

International Search Report dated Jul. 12, 2013, corresponding to International Patent Application PCT/EP2013/057187.
(Continued)

*Primary Examiner* — Jaime Figueroa
(74) *Attorney, Agent, or Firm* — Ladas & Parry LLP

(57) ABSTRACT

A method for operating an industrial robot by means of an operating device, including a step of touching a virtual operating element on a touch-sensitive display of a graphical user interface, said display being surrounded by a frame, wherein a function associated with the operating element is triggered when the virtual operating element is touched. In order to increase the safety of the operation of the industrial robot and to be able to adjust the position of the industrial robot in the desired range, the speed or distance of a deflection of a finger of an operating person during the touching of the virtual operating element of the touch display is detected.

12 Claims, 8 Drawing Sheets

Figure 1:
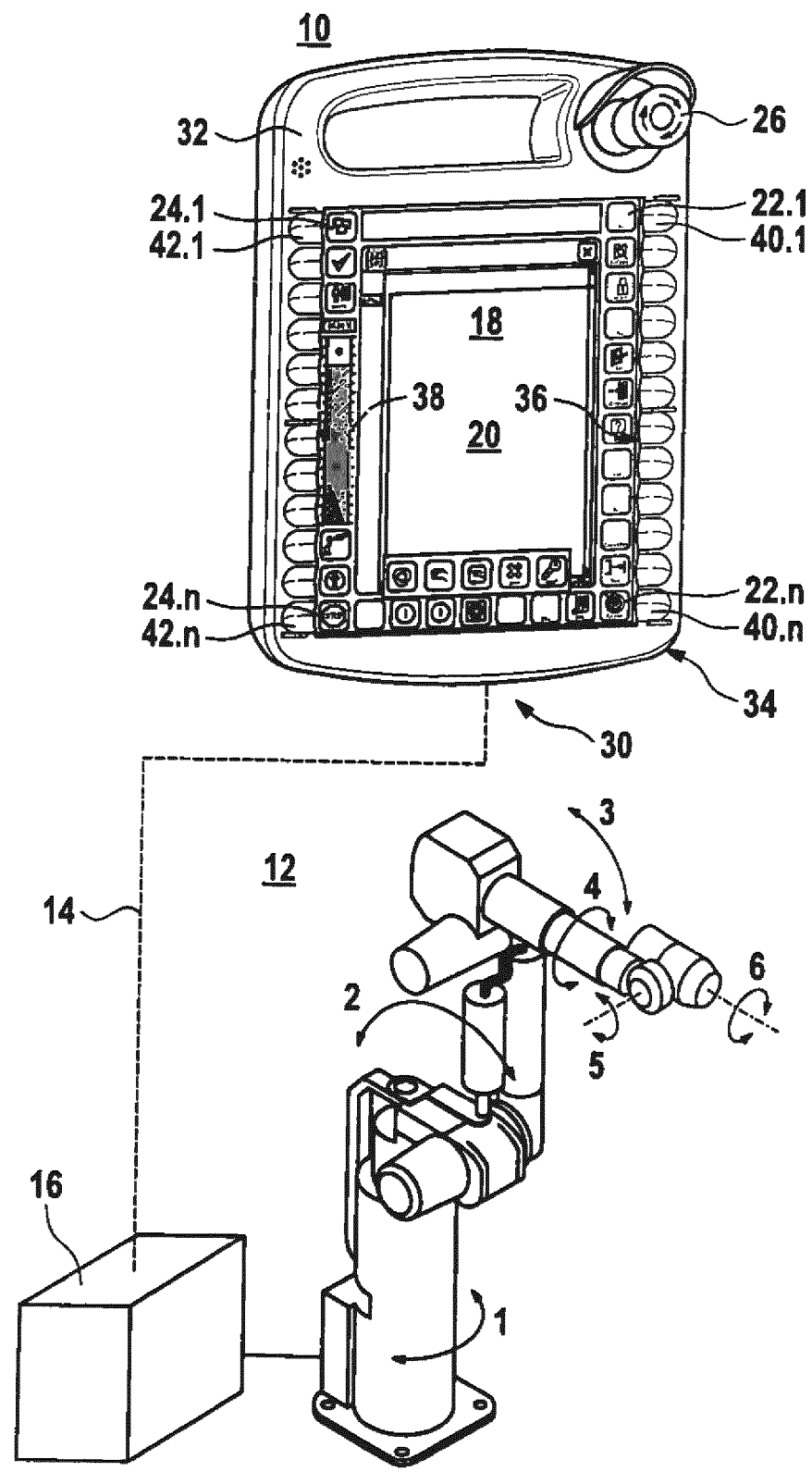

(51) Int. Cl.
*B25J 9/16* (2006.01)
*G05B 19/409* (2006.01)

(56) References Cited

U.S. PATENT DOCUMENTS

| | | | | |
|---|---|---|---|---|
| 6,088,628 | A * | 7/2000 | Watanabe | B25J 9/1656 700/251 |
| 6,278,905 | B1 | 8/2001 | Saito | |
| 6,323,846 | B1 * | 11/2001 | Westerman | G06F 3/0235 345/173 |
| 7,181,314 | B2 | 2/2007 | Zhang et al. | |
| 7,346,478 | B2 * | 3/2008 | Walacavage | G05B 19/056 700/105 |
| 8,289,316 | B1 * | 10/2012 | Reisman | G06F 3/0425 345/173 |
| 8,479,122 | B2 | 7/2013 | Hotelling et al. | |
| 2005/0080515 | A1 * | 4/2005 | Watanabe | B25J 9/1671 700/264 |
| 2008/0165255 | A1 | 7/2008 | Christie et al. | |
| 2009/0109195 | A1 * | 4/2009 | Kent | G06F 3/045 345/178 |
| 2009/0289591 | A1 * | 11/2009 | Kassow | B25J 9/1671 318/568.13 |
| 2010/0152899 | A1 * | 6/2010 | Chang | B25J 9/162 700/262 |
| 2010/0174410 | A1 * | 7/2010 | Greer | A61B 19/2203 700/264 |
| 2013/0116828 | A1 * | 5/2013 | Krause | B25J 9/1605 700/264 |
| 2013/0207920 | A1 * | 8/2013 | McCann | G06F 3/0488 345/173 |

FOREIGN PATENT DOCUMENTS

| | | | |
|---|---|---|---|
| DE | 10303793 A1 | 8/2004 | |
| DE | 102010025781 A1 | 1/2012 | |
| DE | 102010039540 A1 | 2/2012 | |
| JP | 0792726 A1 * | 9/1997 | ............ B25J 9/1671 |
| JP | H10146782 A | 6/1998 | |
| WO | WO 2011153570 A1 * | 12/2011 | ............ B25J 9/1656 |

OTHER PUBLICATIONS

German Office Action dated Nov. 19, 2012, corresponding to German Patent Application 102012103031.6.

Niederhuber, CH.: "Operating panel: multitouch technology combined with haptic elements", etz Elektrotechnik + Automation, No. 1-2/2012, p. 2-4; Cited on p. 2 of the Specification.

M.J. Micire: "Multi-touch Interaction for Robot Command and Control", Dec. 2010.

T. Bader: "Multimodale Interaktion in Muti-Display-Umgebungen", KIT Scientific Publishing.

Sonicwavezor: "Using iPod Touch to control NASA Robot over wifi", Internet Citation, Mar. 24, 2010, p. 1, URL: http://www.youtube.com/watch?v=4XQeZE4nh6M.

M. Edberg et al: "Implementing Multi-Touch Screen for Real-time Control of a Robotic cell At Universidad Politecnica de Valencia", Dec. 31, 2010, URL: http://publications.lib.chalmers.se/records/fulltext/126887.pdf.

Office Action with Search Report dated Apr. 19, 2016 for Chinese Application No. 201380017822.4.

espacenet English abstract of CN 1886237 A.
espacenet English abstract of CN 101198925 A.

* cited by examiner

METHOD FOR OPERATING AN INDUSTRIAL ROBOT

This application is a 371 of PCT/EP2013/057187, filed on Apr. 5, 2013, which claims priority to German Application No. 102012103031.6, filed Apr. 5, 2012.

The invention relates to a method for operating an industrial robot by an operating device comprising the method step of touching a virtual operating element on a touch-sensitive display of a graphic operator interface surrounded by a frame, wherein when the virtual operating element is touched, a function associated with the operating element is initiated, wherein the speed or the stretch of a deflection of a finger of an operating person is detected when touching the virtual operating element of the touch display, which operating element is constructed as a defined moving surface, and a control signal is generated from the speed or the stretch of the deflection, which signal is used for a speed setting or a position setting for movements of the industrial robot.

A device for controlling an industrial robot in the form of a manual operating device is described in DE 10 2010 039 540 A1. The manual operating device can be coupled to a robot control in order to program or control the industrial robot.

The manual operating device comprises an electronic system with a microprocessor in order to be able to communicate with the robot control. Furthermore, the manual operating device comprises a display designed as a touchscreen, an emergency stop key and a switch constructed as a lock. In order to manually move, e.g., a robotic arm the manual operating device comprises input means or moving means that can be manually actuated independently of each other and are constructed, e.g., as a 6D mouse or as a typing . . . keys. There is the possibility of associating each of the moving means with its own reference coordinate system by the touchscreen.

However, in the known design the control of the industrial robot takes place exclusively via the manually actuatable input means so that the manual operating device is expensive to produce and temperamental in operation.

Another device for operating an industrial robot is described in DE 10 2010 025 781 A1. The manual device in the form of a mobile telephone comprises a touchscreen that on the one hand serves as output means for outputting information from the robot control, in particular for representing an operating surface and at the same time serves as command input means for inputting control commands via keys.

The manual device is detachably fastened to a portable safety device by a clamping device such as is known in principle, for example, for holding mobile telephones in motor vehicles and is connected to it by a USB interface. The safety input device comprises an emergency stop button, an enabling switch and a selector switch for the operating type. A disadvantage of this embodiment is that an operator is always forced in order to safely operate the virtual keys to look at the touchscreen in order to avoid false inputs. The same applies in the case of poor environmental conditions such as, for example, a strong incidence of light or darkness that would made an operating of the touchscreen more difficult.

The literature passage, the Ph.D. thesis of Mark John Micire: "Multi-Touch Interaction for robot Command and Control", December 2010 describes the actuation of a robot by moving a finger on a touch screen. The direction in a plane and the speed of a robot can be controlled by the movement of the finger. When the finger is removed from the touch screen the robot comes to a standstill.

According to US 2008/0165255 A1 a vehicle can be controlled in two dimensions by the movement of a finger on the surface of a touch screen.

A multi-touch screen is described in the literature passage NIEDERHUBER, Ch.: "Operating Panel: Multi-Touch Technology Combined with Haptic Elements", in: etz Elektrotechnik + Automation, issue 1-2/2012, pp. 2-4.

The actuation of a NASA robot by a touch screen of an iPod in a film can be gathered from the document SONICWAVEZOR: "Using IPod Touch to Control NASA Robot over Wi-Fi", Internet Citation, Mach 24, 2010, page 1. It is necessary for this that icons represented on the display are touched in order to carry out desired movements.

DE 103 03 793 shows a display in whose longitudinal frame haptic marks constructed as troughs are let in.

The publication Martin Edberg et al.: "Implementing Multi-Touch Screen for Real-Time Control of a Robotic Cell at the Polytechnical University of Valencia", Dec. 31, 2010, Gothenburg, Sweden teaches using virtual operating elements on a display of an operator interface for operating a robot.

In order to be able to execute a robot movement or to use a control using a display, US 2009/0289591 A1 provides icons represented on the display that are to be touched.

The Japanese publication H10 146782 describes a device for teaching the movement of a robot. To this end a display is used on which icons are represented that must be appropriately touched for the movement of the robot.

The present invention is based on the problem of further developing a method of the initially cited type in such a manner that the safety is increased during the operation of an industrial robot. Also, the industrial robot should be adjusted in its position to the desired extent. It should be possible to control the robot in its direction of movement and its speed.

It is suggested in order to solve the problem that a first moving surface for a two-dimensional position setting is defined at a distance from a frame section serving as a haptic mark, and that a second moving surface for a third position setting of the industrial robot is defined inside the distance running along the frame section, wherein the finger is guided along the frame section inside the second moving surface, whereby during the movement of the finger inside the first moving surface the finger has no contact with the frame section serving as haptic mark and during the movement of the finger inside the second moving surface the finger makes a perceptible contact with the frame section.

In particular, a control signal is generated by the deflection of the finger during the touching of one of the moving surfaces which signal is used for the speed setting or the position setting for movements of the industrial robot according to the adjusted mode of the operating device.

In particular, a control signal is generated by the deflection of the finger during the touching of one of the moving surfaces which signal is used for setting the speed or the position for movements of the industrial robot as a function of the adjusted mode of the operating device.

According to the invention a three-dimensional movement of a robot is made possible by a 2-D movement on a touchscreen. At this time a guiding of a finger such as the thumb along a section of the frame surrounding the touch display and serving as a haptic mark takes place in order to adjust the robot in a direction. An adjustment in the remaining directions of the Cartesian coordinate system or of a defined coordinate system takes place at a distance to the finger such as the thumb. As a consequence of the special arrangement the operator can clearly distinguish and blindly reach the two moving fields. The field directly on the display edge—the finger has perceptible contact with the housing edge—will actuate the setting of the movement for the 3d dimension. The field about one finger width next to the display edge actuates the setting of movement in the remaining two dimensions. The finger such as the thumb is distinctly spread to the side here and has no contact with the housing edge. If the operator wants to decide for the first or the second virtual moving surface, the accuracy of the finger is of secondary importance. The first finger contact with the touch display only has to be inside the generously dimensioned one or the other virtual moving surface. The first striking point of the finger is taken as the zero point from which each other finger movement—under permanent finger contact with the touch display—is evaluated as a deflection from which a control signal for the setting of the movement of the robot is generated. This movement supported by the haptic mark of the housing edge permits the movement of the robot in blind operation.

There is furthermore the possibility of switching by changing the mode between the setting of position and the setting of speed for the robot, wherein the same moving surfaces of the touch display can be used in the previously described manner.

The stretch of the deflection of the finger on the defined moving surface or virtual operating element is preferably proportional to the moving speed and/or the position of the industrial robot. After the contacting of the defined moving surface the entire touch display surface, even beyond the field boundaries of the virtual moving surface shown, is available to the finger during the contacting sliding.

The industrial robot comes to a standstill when the operating person lifts his finger from the touch display. Furthermore, it is provided that the sensitivity of the reaction to the movement of a finger over virtual operating element such as a slide regulator is continuously adjusted for the setting of the position as well as for the setting of the speed.

A two-dimensional setting of position such as X and Y coordinates preferably takes place by touching a defined moving surface that is positioned in such a manner on the touch display at a distance to the display edge that the moving surface can be actuated with a finger such as the thumb.

The area of the touch display, which can be a commercially available touchscreen with a smooth surface and that is preferably constructed as a capacitive touch screen, even though a resistive touch screen can also be considered in which a finger, in particular the thumb, must be moved by an operating person in a contacting manner on the touch display in order to set the X-Y coordinates of the robot, runs in a so-called edge-remote area of the touch display, preferably at a distance of at least one thumb-width to the frame surrounding the touch display.

The invention furthermore provides that the industrial robot can be controlled via an operating element in a third coordinate direction (Z coordinate) and arranged laterally on the display edge, wherein the finger of an operating person is guided by the display edge and/or on the display edge and along a haptic mark running from the latter.

The X, Y and Z coordinates are in particular coordinates of the Cartesian coordinate system. The tool orientations (angles of rotation) A, B and C can be controlled by adding at least one other or other virtual moving surfaces. These other moving surfaces are comparable in construction and function to the moving surfaces for the X, Y and Z moving settings and are represented in common with them. The placing on the touch display is selected in such a manner that the moving surface for the moving direction "C" borders on an edge section of the housing frame (the latter serves as a haptic mark) and the moving surface for the moving directions "A" and "B" are placed at a defined distance from the housing edge.

Therefore, all 6 degrees of freedom of a robot can be controlled in blind operation with one touch display.

If a movement is not to take place but rather exclusively an influencing of speed in the X, Y and/or Z direction or A, B and/or C direction, the mode is switched by touching an appropriate virtual element on the touch display in order to adjust the moving speed in the previously described manner.

In other words, the possibility is utilized after the touching of the touch display to use the finger more or less to "pull" in order to produce an analogous movement setting for the robot. Therefore, the robot can be sensitively controlled in 6 degrees of freedom (e.g., X, Y, Z and tool orientation A, B, C).

It is possible with the deflection of the finger to give a setting for a position to the robot similar to the cursor control by touchpad in the case of a notebook. The robot can be simultaneously moved into coordinate directions, e.g., X and Y and A and B.

In another mode a speed setting is generated for the robot by the finger deflection: the more the finger is deflected the quicker the robot moves.

After touching the selected moving surface, the finger can subsequently also be drawn over the over the field boundary over the entire display, therefore producing movement settings. After letting loose, the robot remains immediately standing. Then, the desired field must be hit again for another movement setting.

The sensitivity of the reaction to the finger movement can be continuously adjusted by a regulator, e.g., the override, for the position setting and also for the speed setting.

The sensitive surface for the 2-D moving (X, Y direction and/or A, B direction) is placed in the vicinity of the display edge so that it can still be reached quite well with the finger (e.g. with the thumb spread out) at a distinct distance from the display edge.

In order to also be able to move in the third coordinate direction (Z direction or C direction) a finger-wide field is placed directly on the side of the display edge so that this field can be touched with the finger. This field generates a one-dimensional moving setting (Z direction or C direction).

The operator can clearly distinguish and blindly reach the two moving fields by the special arrangement: The field directly on the display edge (finger has perceptible contact with the housing edge) actuates the moving setting for the third dimension. The field that is approximately one finger-width wide adjacent to the display edge actuates the simultaneous moving setting in two dimensions.

An industrial robot has 6 degrees of freedom. For the adjusting of the tool orientation with the three angles (A, B, C) the same method as described above is used. Here the display is divided into two zones. In one zone (e.g., the upper one) the fields for the dimensions 1-3 (e.g., X, Y, Z) are located. In the other zone (e.g., the lower one) the moving fields for the dimensions 4-6 (e.g., A, B, C) are located. Both zones can be distinguished blindly with haptic marks.

A multi-touch display or single-touch display is used as touch display.

With a multi-touch display the robot can therefore be moved simultaneously in all 6 degrees of freedom. With a single-touch display the moving functions can only be used sequentially.

The device in accordance with the invention is distinguished over the prior art in particular in that the number of hardware components is reduced to an absolute minimum. All operating functions are consequently realized in touch software with the exception of the safety-related switch "emergency stop" and "enabling". No other electrical components such as foil keys, switches or signal lights are necessary. As a consequence, the system is low-maintenance.

The space gained favors a large, comfortable touch display. The virtual operating elements and displays shown on the touch display are designed for industrial use and are shown contrast-rich and large so that a reliable operation is possible.

Another preferred embodiment of the method provides that the touching of the virtual operating element on the surface of the touch display is detected by determining a first coordinate of a contact point, and that an initiation of the function of the virtual operating element takes place when the first coordinate of the contact point leaves, after a constant contact with the surface of the touch display, a given coordinate area by a manual action of the operating person.

The manual action can be initiated by a gesture of the operating person. The gesture can be performed by drawing a finger of the operating person on the touch display into or out of the given coordinate area. The gesture is preferably carried out in a defined direction, wherein the sensitivity of the reaction to the finger movement, the intensity of the gesture, can be continuously adjusted.

Furthermore, the invention refers to a characteristic inventive method for operating an industrial robot with a manual device. It provides that the initiation of a touch function requires a manual action of the operator on the touch display. In order to prevent an unintended initiation of virtual operating elements by an unintended touching, a function is not initiated until after the touching of the touch display a special "small movement" is made, e.g., drawing the finger in a defined direction. This results in a reliable touch.

The gesture required for initiating a function, that is, the required intensity or type of gesture, can be continuously adjusted: It extends from a simple finger contact, generally customary operation of the touch display, to a defined gesture. The finger can slide in continuation of the finger troughs on the touch display by haptic marks such as the special impressing of finger troughs in the display edge and initiate a function at this time. If the operator notices that he initiated an undesired initiation of a function he can suppress the initiation of the function by withdrawing his finger into the original position.

Other details, advantages and features of the invention result not only from the claims, the features to be gathered from them—alone and/or in combination—, but also from the following description of exemplary embodiments to be gathered from the drawings.

Figure 2:
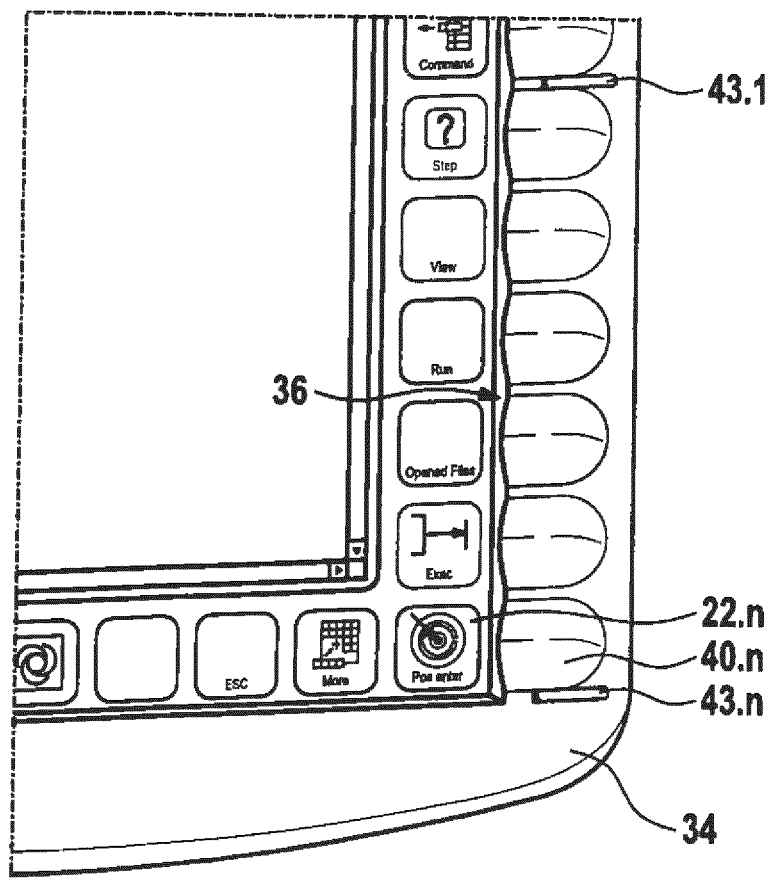
Figure 3:
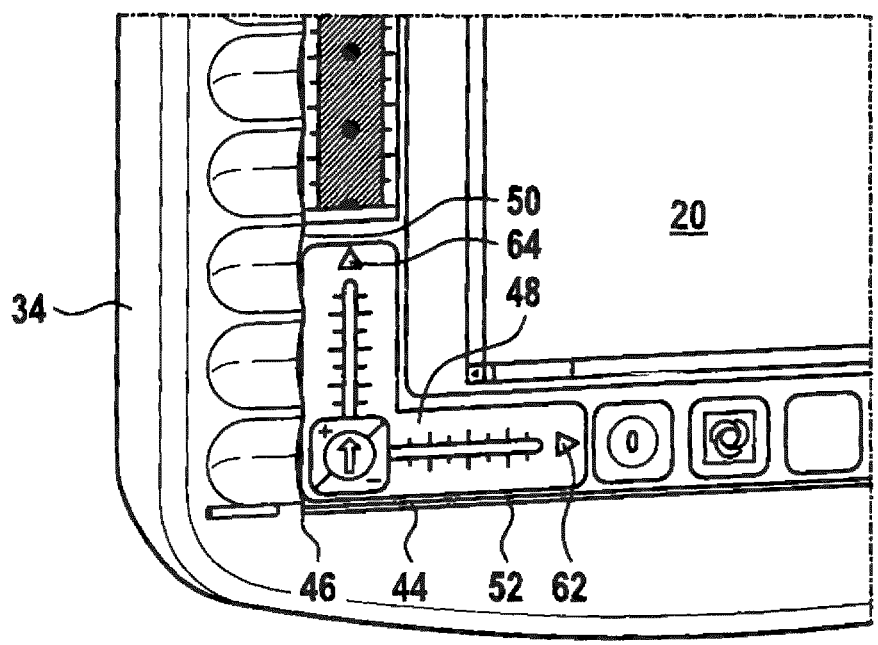
Figure 4:
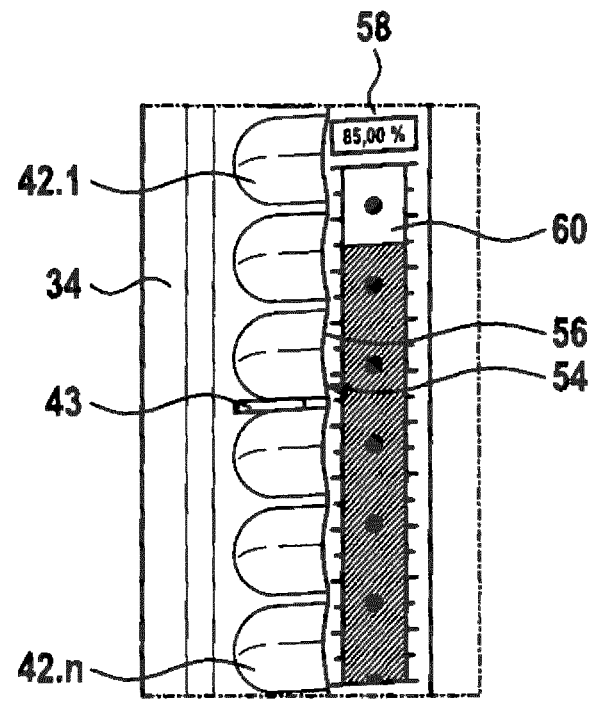
Figure 5:
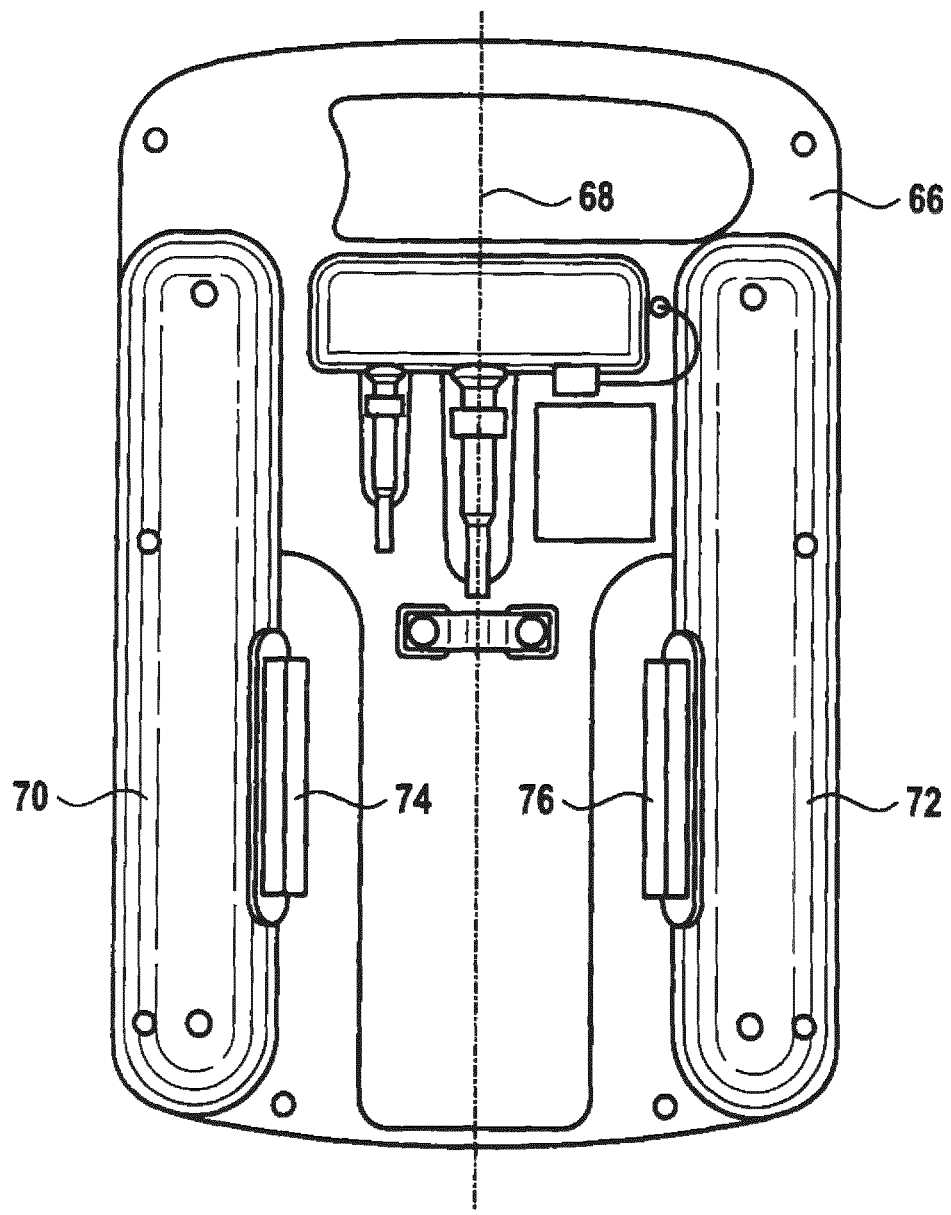
Figure 6:
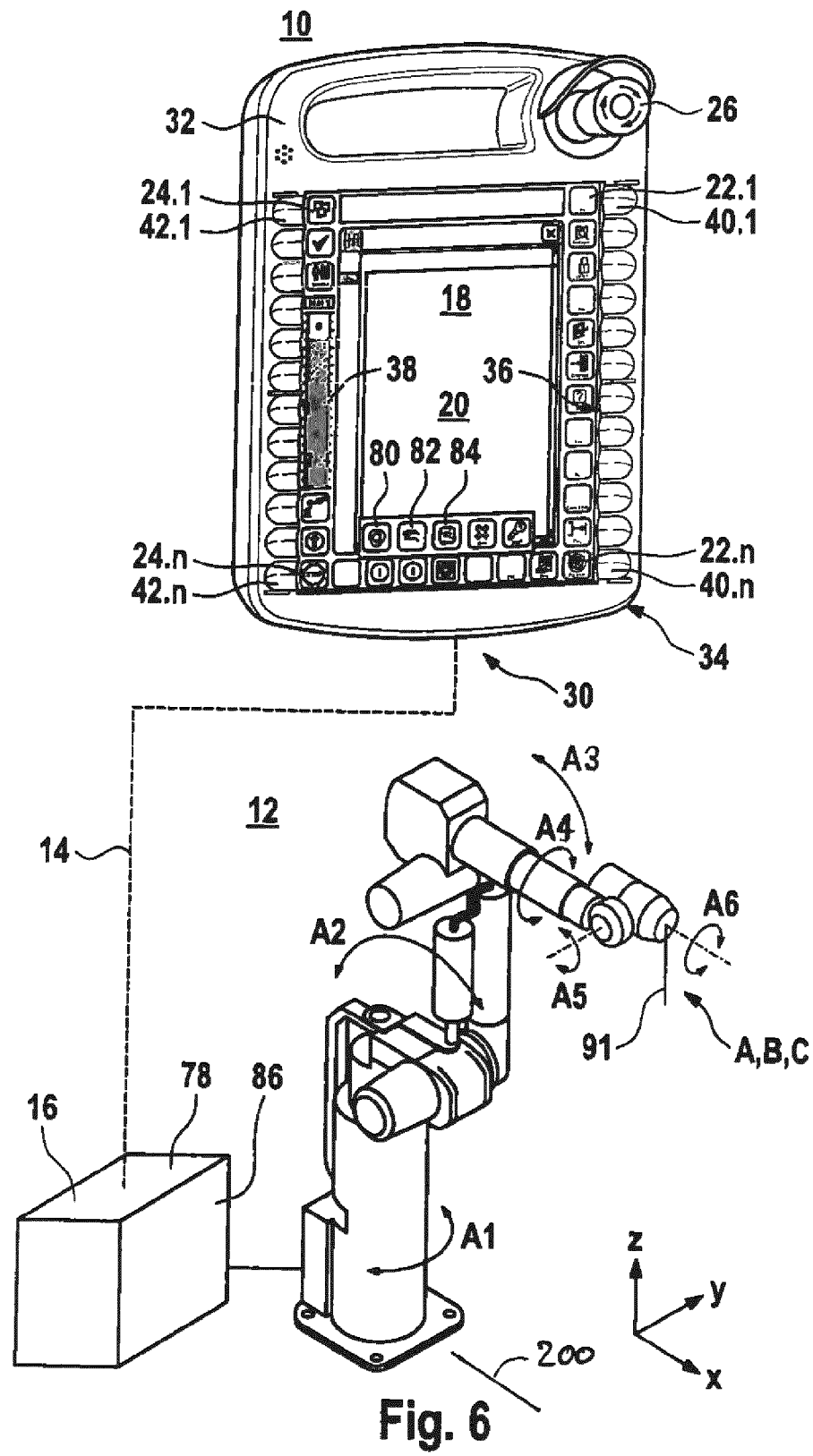
Figure 7:
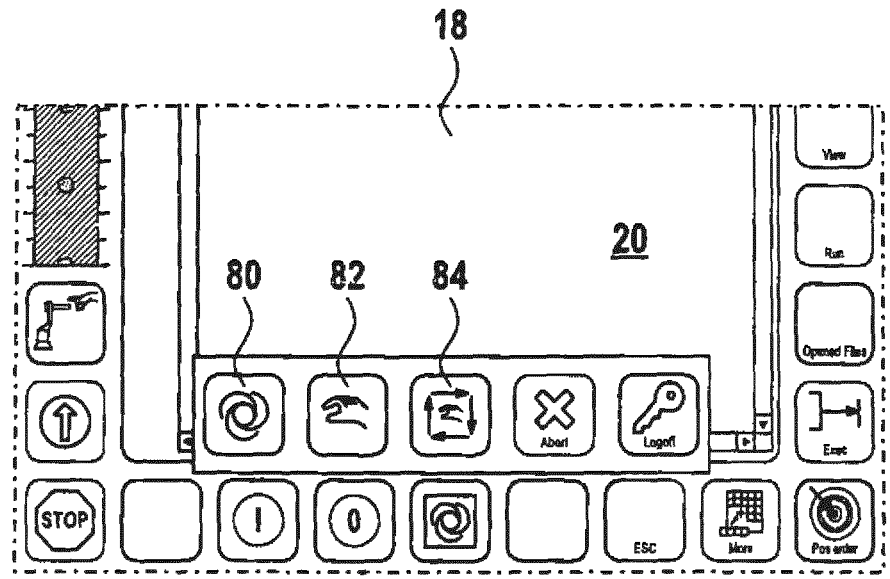
Figure 8:
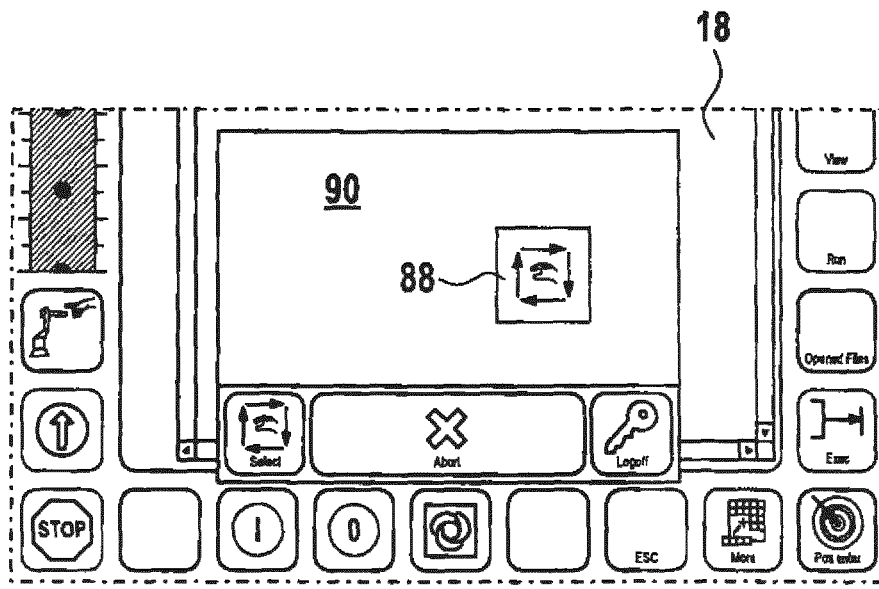
Figure 9:
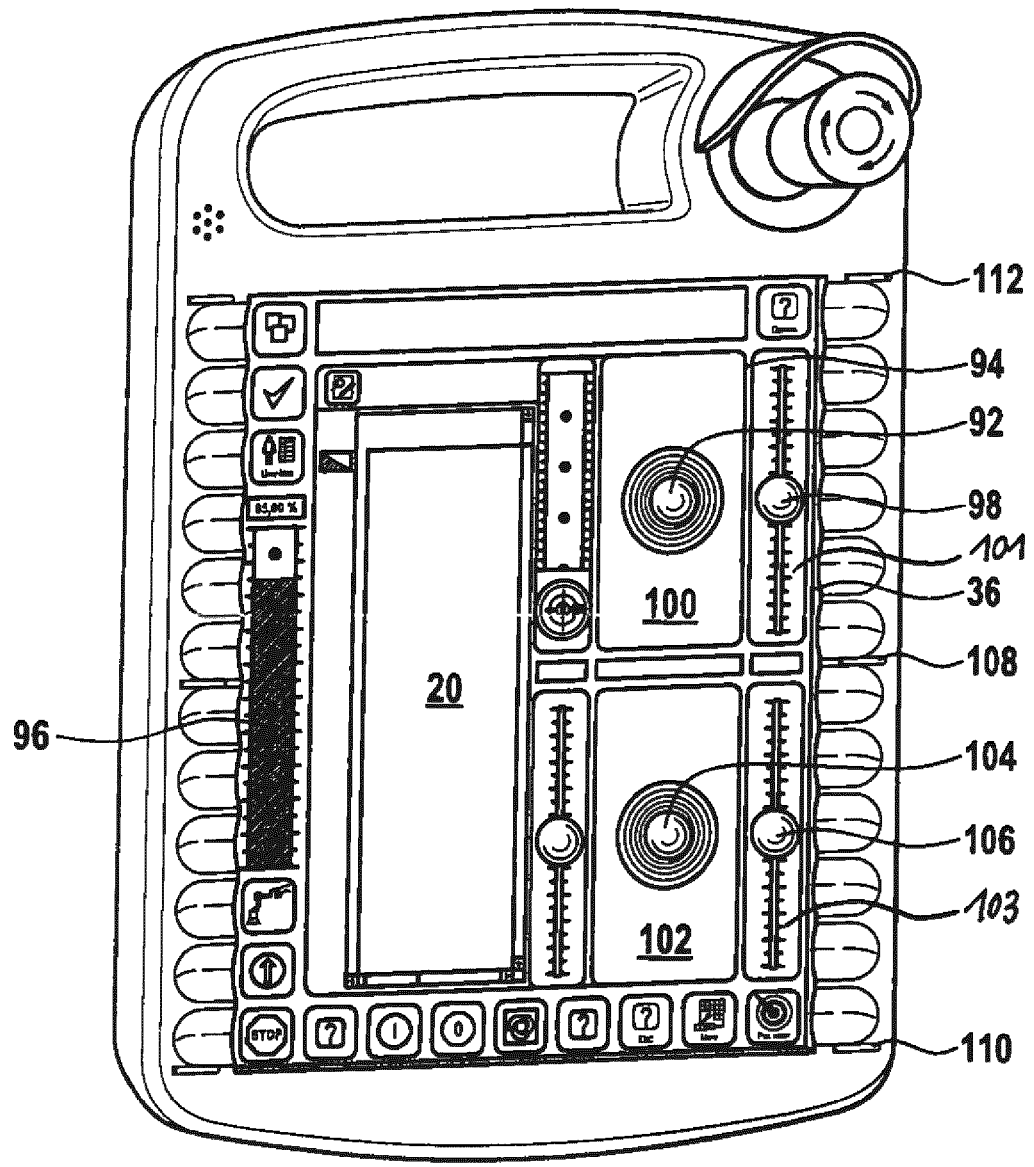
Figure 10:
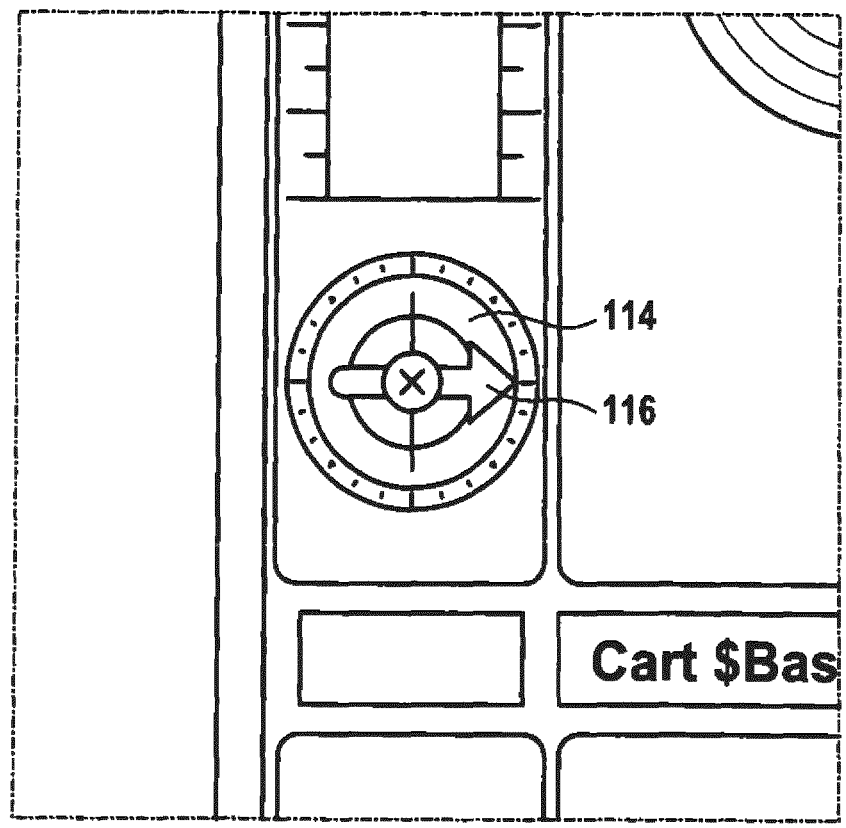

In the drawings:

FIG. 1 shows a programmable manual device for operating an industrial robot,

FIG. 2 shows a section of a display frame of the programmable manual device which frame is adjacent to the touch display, FIG. 3 shows a second section of a display frame adjacent to the touch display, and FIG. 4 shows a third section of a display frame adjacent to the touch display, FIG. 5 shows a rear view of the programmable manual device, FIG. 6 shows a schematic method of operating an industrial robot with an operating device, FIG. 7 shows a section of an operating surface of the operating device with virtual operating elements, FIG. 8 shows a section of an operating surface of the operating device with an image with graphical information, FIG. 9 shows an operating surface of the operating device with different moving surface, and FIG. 10 shows a virtual operating element for recalibrating the coordinate system of the operating device.

FIG. 1 shows a device 10 in the form of a programmable manual device for operating an industrial robot 12. To this end the manual device 10 is connected by a wireless or wired communication connection 14 to a robot control 16. The manual device 10 comprises a graphical operator interface 18 for the touch-sensitive display 20, called touch display in the following. The touch display 20 serves to display at least one virtual operating element $22.1 \ldots 22.n$, $24.1 \ldots 24.n$ that represents a function for controlling, programming or operating the industrial robot 12, wherein when the virtual operating element $22.1 \ldots 22.n$, $24.1 \ldots 24.n$ is touched with a finger of an operator or by a pen, the associated function is initiated.

The manual device 10 furthermore comprises a control unit 30 for controlling the graphical operator interface 18 and for communicating with the robot control 16 as well as a position sensor for determining position and inclination of the operating device.

The graphical operator interface 18 with the touch display 20 is arranged together with the control unit 30 in a housing 32. The housing 32 forms a display frame 34 that surrounds the touch display 20 on the edges. In addition, a safety-relevant "emergency stop" switch 26 is arranged on an upper side of the housing 32.

The virtual operating elements $22.1 \ldots 22.n$ and $24.1 \ldots 24.n$ are arranged along a frame section 36, 38 of the display frame and adjacent to the touch display 20. In order to make possible a blind operation of the virtual operating elements $22.1 \ldots 22.n$ and $24.1 \ldots 24.n$, according to a first characteristic concept of the invention haptic marks $40.1 \ldots 40.n$ and $42.1 \ldots 42.n$ are arranged in the frame sections 36, 38. Each haptic mark $40.1 \ldots 40.n$, $42.1 \ldots 42.n$ can be associated with a virtual operating element $22.1 \ldots 22.n$, $24.1 \ldots 24.n$.

In particular, the virtual operating element $22.1 \ldots 22.n$, $24.1 \ldots 24.n$ is directly adjacent to the haptic mark $40.1 \ldots 40.n$ and $42.1 \ldots 42.n$, so that a direct transition from the haptic mark $40.1 \ldots 40.n$ and $42.1 \ldots 42.n$ to the virtual operating element $22.1 \ldots 22.n$, $24.1 \ldots 24.n$ takes place. Consequently, a finger guided along a haptic mark $40.1 \ldots 40.n$, or $42.1 \ldots 42.n$ is guided quasi in one stroke to the virtual operating element $22.1 \ldots 22.n$, $24.1 \ldots 24.n$. This avoids or minimizes erroneous operations: At first, the position of the virtual operating element is sensed with the aid of the haptic mark and subsequently the function is initiated by touching the virtual operating element. Furthermore, it is not necessary that the touch display 20 has to have a special shape. In particular, and in deviation to the prior art, it is not necessary that special, overlaid materials are applied onto the touch display as a result of which losses of transparency would occur.

The haptic marks $40.1 \ldots 40.n$ and $42.1 \ldots 42.n$ form a guide by which a finger of an operating person is guided to the associated virtual operating element $22.1 \ldots 22.n$, $24.1 \ldots 24.n$.

FIG. 2 shows an enlarged review of the operating elements $22.1 \ldots 22.n$ and the marks $40.1 \ldots 40.n$ associated with them.

The arranging of the virtual operating elements $22.1 \ldots 22.n$ and $24.1 \ldots 24.n$ along the frame sections 36, 38 comprising the haptic marks $40.1 \ldots 40.n$, $42.1 \ldots 42.n$ ensures a reliable operation of the virtual operating elements. The recessed and specially defined frame sections 36, 38 serve for the tactile orientation on the touch display 20.

In the exemplary embodiment shown in FIG. 2 the haptic marks 40.1 ... 40.n, 42.1 ... 42.n are designed as finger troughs that are formed in such a manner that they can be reliably sensed with the fingers and ensure a guiding of the finger from the frame sections 36, 38 in the direction of the associated virtual operating element 22.1 ... 22.n and 24.1 ... 24.n.

Furthermore, haptic marks 43.1 ... 43.n are provided that are constructed as nubs and are arranged on a surface of the display frame 34.

This compensates on the one hand the main lacking haptic of a touch display and on the other hand operator can direct his visual attention onto the industrial robot in the process without having to look at the manual operating device, as a result of which the operating safety is increased on the whole. A "blind operation" is made possible.

FIG. 3 shows an embodiment of a haptic mark 44 as a frame corner 46 of the display frame 34 bordering on the touch display 20. An unambiguous, exact position on the touch display 20 is defined by the frame corner 46 of the display frame 34. A virtual operating element 48 such as a virtual slide element is provided on the touch display 20 at these selected positions that is moved for example, in a linear direction along a display-side frame section 50 or along another frame section 52 of the frame corner 46. The view and the function of the virtual slide element 48 changes as a function of the selected direction of movement.

FIG. 4 shows another embodiment of a haptic mark 54 designed as a display-side frame section 56 of the display frame 34. The finger of an operating person can execute a shifting movement along the frame section 56 by which a virtual slide element 60 running along the frame section 56 can be adjusted.

The haptic marks 40.1 ... 40.n, 42.1 ... 42.n shown in FIGS. 1 and 2 and constructed as finger troughs form a haptic orientation of the display edge with high resolution, e.g., for the sensing of positions of the virtual operating elements 22.1 ... 22.n, 24.1 ... 24.n since they are arranged directly adjacent to the finger troughs. Each finger trough can be unambiguously associated with the virtual operating element. The finger troughs 22.1 ... 22.n, 24.1 ... 24.n are constructed to be half-open and opened in the direction of the touch display 20 so that a finger can slide as guided as in a groove on to the touch display 20 and can initiate a function of the virtual operating element 22.1 ... 22.n, 24.1 ... 24.n there.

According to an independent concept of the invention it is provided that the initiation of a function associated with the virtual operating element 22.1 ... 22.n, 24.1 ... 24.n requires a manual action of the operating person on the touch display 20. In order to prevent an unintended initiation of the virtual operating elements 22.1 ... 22.n, 24.1 ... 24.n by an unintended touching, a function is not initiated until a pre-defined gesture such as, for example, moving a finger in a defined direction is carried out after the touching of the virtual operating element on the touch display 20. The sensitivity of the reaction to the finger movement can be gradually adjusted by a regulator. Therefore, the intensity of the required gesture for initiating functions can be gradually adjusted. It extends from a simple finger contact, a generally customary operation on the touch display 20, to a special, small gesture. As a result of the special definition of the finger troughs 22.1 ... 22.n and 24.1 ... 24.n in the frame sections 36, 38 of the display frame, the finger can slide in a continuation of the finger troughs onto the touch display, initiating a function. If the operator notices that he initiated an unintended initiation of a function, he can suppress the initiation of the function by withdrawing his finger into the original position.

As soon as the operator touches the virtual operating element 22.n with his finger, e.g., starting from the finger trough 40.n, the corresponding coordinates of the contact point on the touch display are detected by the control unit 30. The associated function is not released in accordance with the definition of a preset gesture until the finger of the operator leaves a given coordinate area or reaches a predefined coordinate area. When the virtual operating element is deflected and is therefore ready for initiation (initiation takes place when the finger lets go), this is characterized on the operating element by an optical recognition, e.g., by a colored edging. If an unintended deflection is cancelled again in that the operating element is withdrawn back into its origin, this is made known by a disappearance of this optical recognition.

According to another characteristic inventive concept of the invention virtual operating elements 48 placed, e.g., in the frame corner 46 of the display frame 34 are linked to a special gesture control. They can be shifted, e.g., along the frame sections 50, 52 in two directions 62, 64, as is shown in FIG. 3. Each direction of movement 62, 64 is associated with a selectable function. Therefore, it is, e.g., possible to activate a function "A" when moving along the frame section 52 and a function "B" when moving along the frame section 50. The degree of deflection is evaluated and two possibilities of evaluation are provided.

According to a first possibility of evaluation the degree of the deflection is immediately transmitted as an analog parameter such as the indication of speed to the function. If the finger is let loose in the extended position, the analogous value immediately jumps to zero. If the finger is guided in a sliding manner back into the initial position 66, the parameter is set back to zero again analogous to the deflection. This function can be used, e.g., in order to start a movement program in a positive or negative direction and to vary the speed in a graduated manner at this time.

A second possibility of evaluation provides that when a definable threshold value is exceeded, a switching function is initiated. The activation of the function does not take place until the finger in the extended position leaves the touch display 20 However, if the finger is withdrawn back into the zero position without letting loose of the frame sections 50, 52, the initiation of the function is prevented.

Another characteristic inventive concept of the invention relates to the realization of a so-called override function (speed regulator) that is realized by the virtual sliding operating element 60 shown in FIG. 4. For this, the sliding operating element 60 is placed adjacent to the frame section 56 and centrally to the haptic mark 43. The position of the sliding operating element 60 can therefore be "detected" and be adjusted by shifting the finger along the frame section 56. The blind adjustment is additionally supported by the haptic marks 42.1 ... 42.n, 43, 54 of the frame section 38, 56. The so-called override can be adjusted by a shifting between two haptic marks by a defined amount, e.g., 20%. Even other analogous magnitudes such as process parameters can be adjusted in blind operation by the slide operating element 60 arranged on the edge side.

Another characteristic inventive feature relates to the symmetric arrangement of the haptic marks 22.1 ... 22.n, 24.1 ... 24.n relative to the longitudinal- and/or transversal central axis of the touch display 20. The longitudinal central axis is the straight line running centrally and parallel to the operating frame shanks of the display frame 34. The transversal central axis runs vertically to it, therefore, centrally between and parallel to the shorter transversal shanks of the display frame 34. As a result, it is ensured that the manual device 10 is suited for a right-hand operation and also a left-hand operation. This is achieved in particular by the consequent keyless design of the graphical operator interface and by the symmetric arrangement of the haptic marks. Therefore, the graphic operator interface can be switched by a simple setup function from right-hand operation to left-hand operation. All positions of the virtual operating elements 22.1 . . . 22.$n$, 24.1 . . . 24.$n$ are mirrored here on the longitudinal central axis of the touch display 20.

FIG. 5 shows a back side 66 of the housing 32. Holding strips 70, 72 are arranged on the back side 66 and symmetrically to the longitudinal central axis 68 and the manual device 10 can be securely held by these strips with one or both hands. The holding strips 70, 72 can have an outer geometry that corresponds to cylindrical sections, wherein the holding strips 70, 72 should emanate from the outer edge, that is, from the longitudinal edges of the display frame 34. An enabling switch 74, 76 or enabling feeler is integrated in each holding strip 70, 72, one of which must selectively be activated for freeing the movement of the industrial robot.

This symmetrical arrangement prevents the hands from becoming tired since the enabling switches 74, 76 can be alternately activated with the left or the right hand. If one hand becomes tired, the other hand can assume the enabling without the freeing of the movement being interrupted for the movement of the robot.

Another characteristic inventive embodiment of the invention is distinguished in that a previously customary key switch for the selection of the robot operating types "adjust", "automatic", "automatic test" is replaced by a software function. The touch display 20 is basically a single-channel and therefore unsafe device. A safe functionality of the software is ensured with the aid of a safety control 78, called safety controller 78 in the following, integrated in the robot control 16 according to FIG. 6. The safety controller 78 is described in the European patent application 1 035 953, whose disclosure is included in the present application to its full extent. However, the teaching of the invention is not limited to a safety control according to European patent application 1 035 953.

Different operating type options in the form of virtual operating surfaces 80, 82, 84 such as soft keys are offered for selection on the touch display 20 by the operating surface 18 as is shown in FIG. 7. The operator selects a new operating type "X" by touching one of these soft keys 80, 82, 84. The newly selected operating type is transmitted as the command "request new operating type X" to the safety controller 78 by the software of the operating surface. The safety controller 78 takes graphical information such as icon 88 corresponding to this operating type from its memory 86 and places it on a randomly determined display position in a larger image 90. The position of the icon 88 in the image 90 is known only to the safety controller 78. This image 90 is transmitted as an image file such as a bitmap to the operating surface 18 and is displayed there in a defined position, as is shown in FIG. 8.

The operator must corroborate the operating type recognized by the safety controller 78 by a fingertip on the icon 88 shown. A touching position on the touch display is detected in the form of touch coordinates and transmitted back to the safety controller 78. The latter compares the touch position with the random display position of the icon 88 in the image 90 that is only known to the safety controller. The comparison takes place considering the known position of the image 90 on the touch display 20. If the touch position (within a defined tolerance) is equal to the display position, the initiated change of operating types is carried out. Otherwise, the change of operating type is rejected and the previous operating type is retained.

This method produces a safe active circuit between the operator and safety controller 78:
Operator selects an operating type,
Safety controller 78 displays the recognized operating type on the operating device 10,
Operator corroborates the correctness of the displayed operating type to the safety controller 78,
Safety controller 78 sets the new operating type.

As an alternative to the above-cited method, safety controller 78 can display an iconized numerical code that must be recognized by the operator and entered as a number via a displayed keyboard. The touch position of the displayed numbers of the keyboard is transmitted to the safety controller that checks the correctness of the input.

The icons 80, 82, 84 are stored with secure technology in the safety controller 78.

A request for the change of operating type can optionally also come via a hardware key switch.

The insertion/withdrawal of the key into/from the operating type selection switch is imitated by a login/logout method by a PIN.

The possibility after, the touching of the touch display 20, of "pulling" the finger more or less is used according to a characteristic inventive method to generate an analogous movement setting for the industrial robot 12. In this manner the industrial robot 12 can be sensitively controlled according to FIG. 6 in 6 degrees of freedom, e.g., X, Y, Z and orientations A, B, C of a tool 91.

It is possible with the deflection of the finger to give a position setting to the industrial robot 12 in a manner similar to the cursor control by touchpad in a notebook. The industrial robot 12 can be moved in this case simultaneously in two coordinate directions, e.g., the X and Y direction of the Cartesian coordinate system.

In another mode a speed setting for the industrial robot 12 is produced by a deflection of the finger; the more the finger is deflected, the more rapidly the robot moves.

After having touched a selected moving surface 100 shown in FIG. 9 the user actuates a virtual operating element 92 that is positioned in the area of the touching point. The virtual operating element 92 can subsequently be drawn by the finger over the entire touch display 20, even over a boundary 94, and thus generate moving settings. After letting loose, the industrial robot the industrial robot 2 immediately remains standing. Then, the desired surface 92 must be hit again for a new moving setting.

The sensitivity of the reaction to a finger movement can be continuously adjusted by a virtual operating element 96 such as a slide regulator (override) for the position setting and also for the speed setting.

The sensitive surface 100 for the 2-D moving is placed in the vicinity of the display edge 36 so that it can still be readily reached with a clear distance to the display edge by the finger (e.g., with the spread-out thumb).

In order to also be able to move in a third coordinate direction (e.g., the Z coordinate of the Cartesian coordinate system), a field 101 that is approximately wide as a finger is laterally placed directly on the display edge 36 with the virtual operating element 98 so that this field 101 can be "felt" with the finger in that the finger, in particular the thumb, is guided along the display edge 36. This field produces a one-dimensional moving setting, e.g., in the Z direction.

As a result of the special arrangement the operator can clearly differentiate and blindly reach the two moving fields 100, 101: The field 101 directly on the display edge 36, wherein the finger has perceptible contact with the housing edge, actuates the moving setting for the third dimension (Z dimension). The field 100, that is placed approximately one finger width or thumb width adjacent to the display edge 36, actuates the simultaneous moving setting in two dimensions (X-Y dimension).

The industrial robot 12 has 6 degrees of freedom. For the adjusting of the orientation of the tool 91 with the three angles (A, B, C) the same method as was described above is used. To this end the display is divided into two zones. The moving fields 100, 101 for the dimensions 1-3 (e.g., X, Y, Z) are located, e.g., in the upper zone. The moving fields 102, 103 for the dimensions 4-6, e.g., A, B, C are located, e.g., in the lower zone. The two fields 100, 101 and 102, 103 can be distinguished blindly by the haptic marks in the form of nubs 108, 110, 112.

After having touched the moving surface 102 the user actuates a virtual operating element 104 that is positioned in the area of the touching point. Subsequently, the virtual operating element 104 can be shifted on the touch display in order to produce a moving setting.

Therefore, the industrial robot 12 can be simultaneously moved in all 6 degrees of freedom with a multi-touch display 20. With a single-touch display the moving functions can be used only sequentially.

During the moving by the previously explained touch motion function the touch display is ideally aligned col-linearly to the coordinate system of the industrial robot. In this case the robot movement optimally coincides with the finger movement on the touch display.

However, if the user turns away to the side with the operating device 10, then this coincidence is no longer given. The direction of movement of the robot then no longer coincides with the direction of movement of the finger.

In this case the coordinate system of the touch display must be recalibrated again with the coordinate system of the robot.

According to a characteristic inventive embodiment of the invention a special virtual operating element 114 with an indicator 116 is provided to this end on the touch display 20.

The operating element 114 must at first be touched with a finger and subsequently the finger must be drawn with permanent contact with the touch display parallel to a selected direction of the robot coordinate system, e.g., the X direction. For the visual support of the operator the selected direction of the robot coordinate system, e.g., the X direction, can be characterized, e.g., by a marking of the bottom surface. Such a marking is characterized by way of example in FIG. 6 by "200". After the finger has been lifted off the touch display 20, a vector direction is calculated between the first touch point and the letting loose point and the indicator 116 is represented in accordance with the determined vector direction on the display.

The recalibration method used here is based on the assumption that in a basic state of the calibration, e.g., the longer display edge, that sets, e.g., the X axis of the display coordinate system, is aligned parallel to a main axis of the robot coordinate system, e.g., the X axis. In this "merged" state the robot will correctly follow the directions given by the finger movement in the touch-controlled hand moving.

In the case of a required recalibration the touch display is rotated through a certain angle to the selected direction of the robot coordinate system, e.g., the X direction, and the indicator 166 is aligned according to the described method for the manual adjustment of the indicator parallel to the selected direction of the robot coordinate system, e.g., the X direction, and consequently stands in a certain, sought angle to the X axis of the display coordinate system. An angle is calculated between the indicator direction and the direction of the X axis of the display coordinate system and is entered into a rotation matrix that now transforms all movements of the finger on the touch display before they are transmitted as a moving setting to the robot control. After the recalibration both coordinate systems are again adjusted with each other in a co-linear manner, quasi-merged.

This recalibration method, including the finger movement, lasts only fractions of a second and is therefore one of the most rapid manual recalibration methods. No additional sensors such as magnetometers or gyrometers are required, as a result of which the method can be economically realized on every operating device.

This calibration method can also be used for any other coordinate systems such as, e.g., freely defined frames.

The invention claimed is:

1. A method for operating an industrial robot using an operating device, the method comprising the steps of:
   providing an operating device comprising a microprocessor, wherein the operating device communicates with a control of the industrial robot;
   said operating device comprising a graphic operator interface having a touch display, and an operating element associated with the touch display, said touch display being surrounded by a frame;
   touching the virtual operating element with an object;
   wherein a function associated with the virtual operating element is initiated in response to the virtual operating element being touched;
   detecting a speed, or a stretch, of a deflection of the object touching the virtual operating element;
   generating a control signal from the speed, or the stretch, of the deflection of the object touching the virtual operating element;
   using the control signal to set a speed or a position of movements of the industrial robot;
   setting a first- and second-dimensional position by defining a first moving surface at a distance from a section of the frame; and
   setting a third-dimensional position by defining a second moving surface inside the distance.

2. The method according to claim 1, wherein the first moving surface defines a haptic mark.

3. The method according to claim 1, wherein the deflection of the object on the first moving surface, or of a movement of the virtual operating element being moved by the object, is proportional to at least one of a speed of movement and a change of position of the industrial robot.

4. The method according to claim 1, comprising:
   touching the first moving surface and exceeding a boundary; and
   drawing the object over an entire area of the touch display to generate settings of the movement and the position of the industrial robot.

5. The method according to claim 1, further comprising lifting the object from the touch display to cause the industrial robot to come to a standstill.

6. The method according to claim 1, further comprising continuously adjusting a sensitivity of a reaction to the movement of the object over the virtual operating element.

7. The method according to claim 1, wherein the virtual operating element is a slide regulator.

8. The method according to claim 1, comprising positioning the first moving surface with respect to the touch display and the frame to allow operation of the first moving surface with the object.

9. The method according to claim 1, comprising using at least one of the frame and haptic mark to guide the object during a control of the industrial robot in a Z-direction of the Cartesian coordinate system.

10. The method according to claim 1, wherein the touch display is a multi-touch display or a single-touch display.

11. The method according to claim 10, comprising moving the industrial robot in six degrees of freedom using the multi-touch display;
   wherein an adjustment of moving paths in X-, Y-, and Z-directions of the Cartesian coordinate system takes place in a first zone of the touch display; and
   wherein an adjustment of an orientation of a tool takes place in a second zone of the touch display.

12. The method according to claim 1, wherein the object is a digit of a user of the operating device.

* * * * *